United States Patent [19]

Saito

[11] 4,355,707

[45] Oct. 26, 1982

[54] DISC BRAKE WITH QUICKLY CHANGEABLE PADS

[75] Inventor: Kazuo Saito, Kawasaki, Japan

[73] Assignee: Tokico Ltd., Kawasaki, Japan

[21] Appl. No.: 197,326

[22] Filed: Oct. 15, 1980

[30] Foreign Application Priority Data

Oct. 20, 1979 [JP] Japan .................... 54-145234[U]

[51] Int. Cl.³ ........................................... F16D 65/12
[52] U.S. Cl. ........................ 188/73.32; 188/73.45
[58] Field of Search ............... 188/73.45, 73.44, 73.39, 188/73.32, 73.33, 73.34, 73.1

[56] References Cited

U.S. PATENT DOCUMENTS 4,049,086  9/1977  Rath ......................... 188/73.45 X
4,139,082  2/1979  Edwards ...................... 188/73.32

FOREIGN PATENT DOCUMENTS 2804977  8/1979  Fed. Rep. of Germany ... 188/73.45

*Primary Examiner*—Douglas C. Butler
*Attorney, Agent, or Firm*—Wenderoth, Lind & Ponack

[57] ABSTRACT

A disc brake including a stationary holder having a pair of arm portions spaced in the direction of the circumference of a rotatable disc and straddling the circumferential edge of the disc, a pair of guide pins mounted on the holder, a caliper slidably supported on the guide pins, a pair of friction pads disposed on opposite sides of the disc and slidably mounted on the arm portions, and a brake actuating mechanism provided in the caliper for pressing one of friction pads against the disc and displacing the caliper with respect to the guide pin so as to press the other friction pad against the disc. Each guide pin includes a first portion for slidably supporting the friction pads with the opposite ends of the first portion being supported on each arm portion of the holder, and an extending portion slidably supporting the caliper thereon.

3 Claims, 5 Drawing Figures

Fig. 3
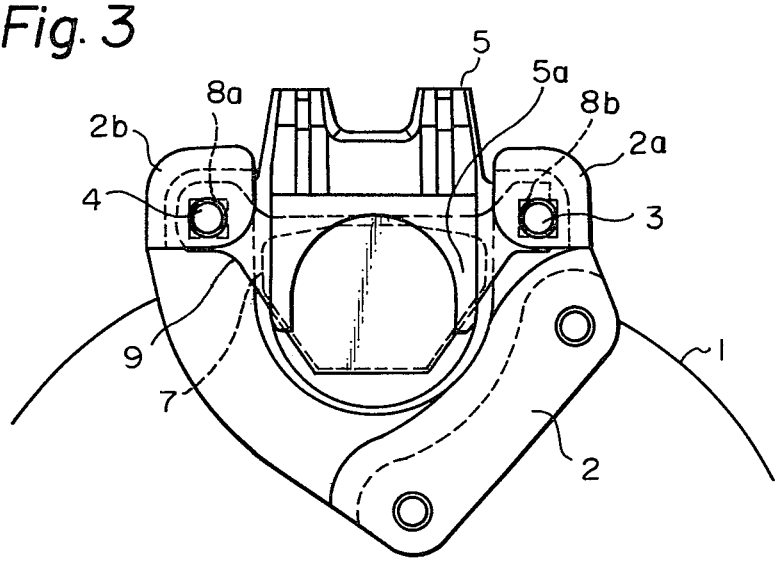
Fig. 4
Fig. 5
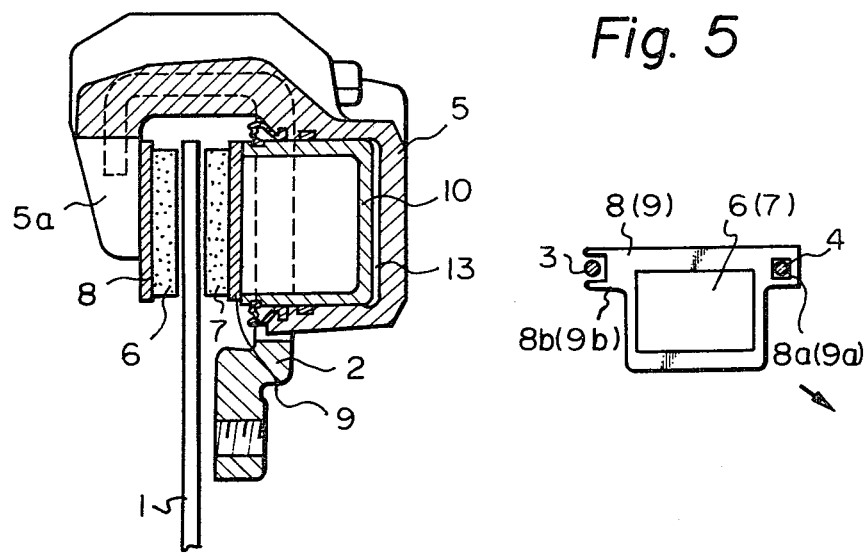

DISC BRAKE WITH QUICKLY CHANGEABLE PADS

BACKGROUND OF THE INVENTION

This invention relates to a disc brake and more particularly to a disc brake of the kind including a holder secured to a non-rotatable part of a vehicle, a pair of guide pins mounted on the holder, a caliper slidably supported on the guide pins and being displaceable relative thereto in the direction of the axis of a rotatable disc and having a limb portion straddling the circumference of the disc, a pair of friction pads disposed on opposite sides of the disc, and a brake actuating mechanism incorporated in the caliper for pressing one of friction pads against one surface of the disc and displacing the caliper, thereby pressing the other friction pad against the other surface of the disc.

Conventionally, in a disc brake of this kind the friction pads are directly supported on a pair of arm portions of the holder which straddle the circumference of the disc, and thus it is necessary to form guide surfaces on respective arm portions by an operation such as a machining operation. Typically, two opposing vertical guide surfaces and two horizontal guide surfaces have been formed for each friction pad, and thus it is expensive and time consuming to fabricate eight guide surfaces on the arm portions of the holder. Further, there is another problem that the friction pads will escape from the guide surfaces when the friction pads have worn excessively.

It has been proposed to provide another pair of pins for slidably supporting the friction pads; however, the number of parts will thereby be increased and the construction made more complicated.

SUMMARY OF THE INVENTION

An object of the invention is to provide a disc brake avoiding the shortcomings aforementioned and, according to the invention, each guide pin includes a portion for slidably supporting the friction pads with the opposite ends of the portion being supported on each arm portion of the holder, and an extending portion for slidably supporting the caliper.

BRIEF DESCRIPTION OF THE DRAWINGS

The invention will now be explained in detail with reference to accompanying drawings illustrating a preferred embodiment of the invention, in which:

FIG. 3 is a rear view of the disc brake of FIG. 1;

FIG. 4 is a sectional view taken along line IV—IV in FIG. 2, and

FIG. 5 is a schematic view showing the positional relationship between friction pads and guide pins.

DETAILED DESCRIPTION OF THE PREFERRED EMBODIMENT

Figure 1:
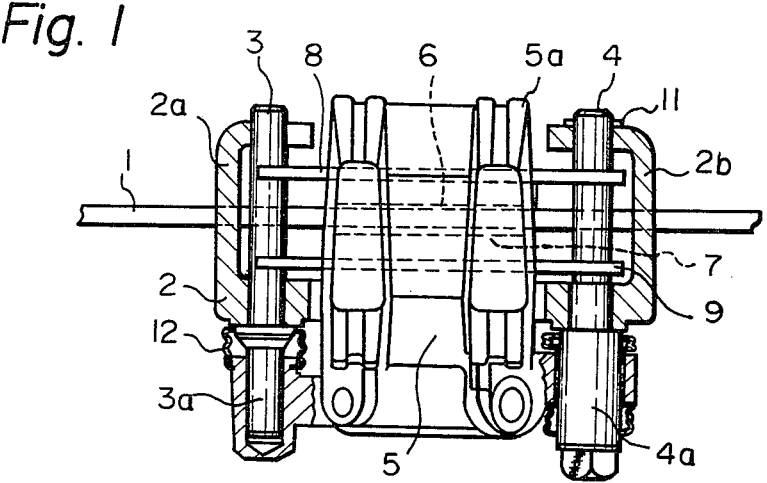
FIG. 1 is a partial sectional plan view of a disc brake according to the invention.

The disc brake shown in the drawings comprises a holder 2 adapted to be secured to a non-rotatable part (not shown) of a vehicle on one side of a rotatable disc 1. The holder 2 has two arm positions 2a and 2b which are spaced in the direction of the circumference of the disc 1 and straddle the circumferential edge of the disc 1 respectively. A guide pin 3 extending in the direction of the axis of the disc 1 is secured to one of the arm portions 2a of the holder 2 by, for example, a force fitting process. The guide pin 3 has a first portion the opposite ends of which are secured to the one arm portion 2a on the opposite sides of the disc, and an extending portion 3a extending from one end of the first portion. A guide pin 4 having an extending portion 4a is supported on the other arm portion 2b of the holder 2. The guide pin 4 differs from the guide pin 3 in that the guide pin 4 is removably supported on the arm portion 2b. The guide pins 3 and 4 straddle the circumferential edge of the disc 1, as shown in the drawings, so as to extend to the opposite sides of the disc 1.

Figure 2:
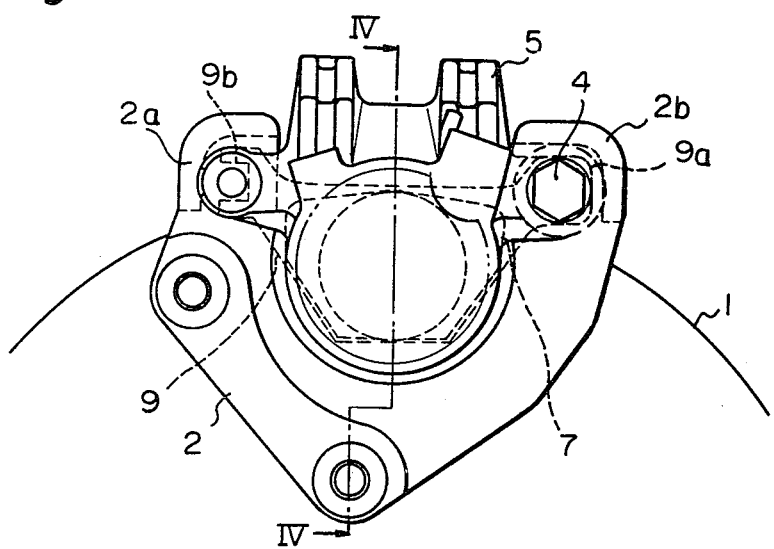
FIG. 2 is a front view of the disc brake of FIG. 1.

A caliper 5 straddling the circumference of the disc 1 is slidably supported on the extending portions 3a and 4a of the guide pins 3 and 4. A pair of friction pads 6 and 7 disposed on the opposite sides of the disc 1 are supported on the guide pins 3 and 4. A limb portion 5a of the caliper 5 engages with rear surface of the friction pad 6. Openings 8a and 9a are formed in backing plates 8 and 9 of the friction pads 6 and 7 for slidably passing therethrough the guide pin 4. Bifurcated portions 8b and 9b are formed on the backing plates 8 and 9 for slidably engaging with the guide pin 3. It will be noted that the lower half of the bifurcated portions 8b and 9b as seen in FIGS. 2 and 3 may be omitted. A pad spring (not shown) is provided between the caliper 5 and the friction pads 6 and 7 to bias the friction pads in the downward direction as viewed in FIGS. 2 and 3. A brake actuating mechanism including a cylinder 13 and a piston 10 is provided in the caliper 5. The extending portion 4a of the guide pin 4 essentially consists of a sleeve slidably and sealingly passing through an opening formed in the caliper 5. The guide pin 4 shown in the drawing is a rod member passing through the sleeve, axially spaced openings formed in the arm portion 2b of the holder 2, and openings 9a and 8a of the friction pads 7 and 6. A retaining pin 11 retains the rod member and, accordingly, the sleeve.

In operation, oil under pressure is supplied to the cylinder 13 by depressing a brake pedal (not shown), the piston 11 presses the friction pad 7 against one surface of the disc 1, and the caliper 5 is displaced on the extending portions 3a and 4a of the guide pins 3 and 4 by the reaction force whereby the limb portion 5a of the caliper 5 presses the friction pad 6 against the outer surface of the disc 1. The braking torques acting on the friction pads 6 and 7 are received by the holder 2 through the guide pins 3 and 4; however, the extending portions 3a and 4a of the guide pins 3 and 4 receive substantially none of the braking torque transmitted to the guide pins 3 and 4 thereby permitting the smooth sliding movement of the caliper with respect to the guide pins.

In replacing friction pads 6 and 7, the guide pin 4 or the rod member is removed from the holder 2. The friction pads 6 and 7 can easily be removed by displacing them in the direction of the arrow shown in FIG. 5. As compared with one prior art disc brake, it is not necessary to rotate the caliper 5 around the guide pin 3, and thus it is very easy to replace the friction pads. In the embodiment, it is not necessary to remove the sleeve from the caliper 5 in removing the guide pin 4 from the holder 2, and thus the pad replacing operation is further simplified.

As described hereinbefore, the present invention has many advantages over the prior art disc brake, such that it is possible to omit the machining operation for forming guide surfaces on the holder, to prevent the friction pads from escaping from the guide surfaces when the friction pads have excessively worn, to assure the smooth sliding movement of the caliper, to easily replace the friction pads, and to omit the space for rotating the caliper when replacing the friction pads.

What is claimed is:

1. A disc brake comprising a holder adapted to be secured to a non-rotatable part of a vehicle and having two arm portions spaced in the direction of the circumference of a rotatable disc, said arm portions respectively straddling the outer circumferential edge of the disc, two guide pins respectively extending in the direction of the axis of the disc, each of said guide pins having a first portion and further having a second portion extending from one end of the first portion, the opposite ends of the first portion of each of the guide pins being supported on the respective arm portions of the holder, a caliper means slidably supported on said second portions of the guide pins, a pair of friction pads disposed on opposite sides of the disc and engaged by said caliper means, said friction pads each having a bifurcated end slidably supported on the intermediate portion of the first portion of one of the guide pins and the other end being slidable on the other of said pins, and the other of said pins being removable axially thereof for dismounting the friction pads from the disc brake, said arm portions being open radially inwardly of the disc for permitting removal of the pads.

2. A disc brake as set forth in claim 1 wherein the friction pads have holes at the other end from the bifurcated end through which the other of the guide pins extends.

3. A disc brake as set forth in claim 2 further comprising a sleeve slidably and sealingly extending through said caliper, and said other guide pin releasably extends through said sleeve in the corresponding arm portion of the holder.

* * * * *